United States Patent [19]

Washiyama et al.

[11] Patent Number: 4,994,515
[45] Date of Patent: Feb. 19, 1991

[54] HEAT-RESISTANT RESIN COMPOSITION

[75] Inventors: Junichiro Washiyama; Chikara Aoyama; Tetsuo Yasuda, all of Kanagawa, Japan

[73] Assignee: Showa Denko Kabushiki Kaisha, Tokyo, Japan

[21] Appl. No.: 371,863

[22] Filed: Jun. 27, 1989

[30] Foreign Application Priority Data

Jun. 27, 1988 [JP] Japan .................. 63-158508
Jun. 27, 1988 [JP] Japan .................. 63-158509
Jun. 28, 1988 [JP] Japan .................. 63-158054

[51] Int. Cl.$^5$ .............................. C08L 51/04
[52] U.S. Cl. ........................ 524/269; 524/504; 525/65; 525/73
[58] Field of Search ........... 524/269, 504; 525/65, 525/73

[56] References Cited

U.S. PATENT DOCUMENTS 4,235,978  11/1980  Luce et al. ............. 524/281
4,567,233   1/1986  Tomono et al. ......... 525/73
4,739,001   4/1988  Okamoto et al. ....... 524/269

FOREIGN PATENT DOCUMENTS 0180471  5/1986  European Pat. Off. .

OTHER PUBLICATIONS

Database Chemical Abstracts: European Search Report.

*Primary Examiner*—Joseph L. Schofer
*Assistant Examiner*—J. Smith
*Attorney, Agent, or Firm*—Sughrue, Mion, Zinn, Macpeak & Seas

[57] ABSTRACT

A resin composition comprising (A) at least one heat-resistant resin, (B) at least one thermoplastic resin, (C) an antimony oxide, (D) at least one bromine-containing reaction product selected from the group consisting of (1) a compound having a molecular weight of from 1,200 to 6,000 and a bromine content of from 5.0 to 60% by weight which is obtained by reacting a bromine-containing epoxy compound and 1,3,5-tribromophenol, and (2) a compound obtained by reacting a bromine-containing epoxy compound having an epoxy equivalent of from 450 to 7,000 and a bromine content of from 5.0 to 52% by weight and an acrylonitrile-butadiene copolymer having a carboxyl group at the both terminals thereof and a molecular weight of from 1,000 to 10,000, and (E) at least one silicon-containing compound selected from the group consisting of (1) silicone oil, (2) a ladder silicone resin, and (3) an alkoxysilane having a mercapto group, a vinyl group or a methacryloyl group, is disclosed. The resin composition is excellent in heat resistance, impact resistance, flame retardancy, and molding properties.

18 Claims, No Drawings

HEAT-RESISTANT RESIN COMPOSITION

FIELD OF THE INVENTION

This invention relates to a heat-resistant resin composition. More particularly, it relates to a resin composition suitable for a material of parts of electronic and electrical equipment, which is excellent not only in heat resistance but also in impact resistance as well as flame retardancy.

BACKGROUND OF THE INVENTION

Housings of electronic and electrical equipment, such as TV sets, CRT, various computers, facsimiles, and word processors, are generally made of flame-retardant styrene resins, e.g., acrylonitrile-butadiene-styrene terpolymers (ABS resins). These flame-retardant styrene resins generally have a heat distortion temperature between 70° and 90° C. at the highest, as measured under a load of 264 psi according to ASTM D648, and the insufficiency in heat resistance frequently causes troubles in some uses or sizes of the products.

Synthetic resins having a heat distortion temperature of 100° C. or higher include polyphenylene oxide resins (PPO) and polycarbonate resins (PC), but they are poor in molding properties. It has been therefore demanded to develop synthetic resins or resin compositions which are inexpensive and excellent in both heat resistance and flame retardancy.

In order to improve molding properties of PPO and PC, it has been proposed to blend PPO or PC with heat-resistant polymers, e.g., styrene-maleimide copolymers, as disclosed in U.S. Pat. Nos. 4,278,775 and 4,160,792. Although these polymer blends exhibit satisfactory heat resistance and molding properties, there still remains the problem of poor flame retardancy.

It has also been proposed to blend vinyl chloride resins with styrene-maleimide copolymers as disclosed in U.S. Pat. No. 4,458,046. This composition is, though excellent in flame retardancy, poor in heat resistance.

It has further been proposed to add a halogen-containing flame retardant, e.g., decabromodiphenyl ether, to styrene-maleimide copolymers as described in U.S. Pat. No. 4,032,509. The composition is, however, insufficient in flame retardancy and liable to drip with fire, a so-called dripping.

It has furthermore been attempted to copolymerize a monomer, e.g., styrene compounds and maleimide compounds, with a halogen-containing comonomer, such as brominated phenylmaleimide compounds as disclosed in U.S. Pat. Nos. 4,609,711 and 4,661,574, and brominated (meth)acrylate compounds as disclosed in U.S. Pat. No. 4,051,311. However, the copolymers should have a large content of the expensive halogen-containing monomer so as to impart sufficient flame retardancy, which is unacceptable for practical use.

Thus, it has been keenly demanded to develop a synthetic resin or a composition thereof which satisfy all the requirements of flame retardancy, heat resistance, impact resistance, and molding properties.

SUMMARY OF THE INVENTION

One object of this invention is to provide a resin composition free from the above-described disadvantages, i.e., a resin composition which is excellent in heat resistance and impact resistance, satisfactory in flame retardancy and molding properties, and also relatively cheap.

The present invention relates to a resin composition comprising:

(A) at least one heat-resistant resin selected from the group consisting of (1) a copolymer comprising a styrene compound and an $\alpha,\beta$-unsaturated dicarboxylic acid imide compound (hereinafter simply referred to as "imide compound") and (2) a rubber-reinforced copolymer comprising a styrene compound and an imide compound, (B) at least one thermoplastic resin selected from the group consisting of (1) a high-impact resin obtained by graft-copolymerizing (i) styrene and acrylonitrile or (ii) styrene and methyl methacrylate to (iii) a butadiene rubber, an ethylene-propylene rubber or an acrylic ester rubber and (2) a copolymer resin comprising (i) styrene and acrylonitrile or (ii) styrene and methyl methacrylate, (C) an antimony oxide, (D) at least one bromine-containing reaction product selected from the group consisting of (1) a compound having a molecular weight of from 1,200 to 6,000 and a bromine content of from 5.0 to 60% by weight, obtained by reacting a bromine-containing epoxy compound and 1,3,5-tribromophenol, and (2) a compound obtained by reacting a bromine-containing epoxy compound having an epoxy equivalent of from 450 to 7,000 and a bromine content of from 5.0 to 52% by weight and an acrylonitrile-butadiene copolymer having a carboxyl group at the both terminals thereof and a molecular weight of from 1,000 to 10,000, and (E) at least one silicon-containing compound selected from the group consisting of (1) silicone oil, (2) a ladder silicone resin, and (3) an alkoxysilane having a mercapto group, a vinyl group or a methacryloyl group, wherein the amounts of the styrene compound and imide compound in said heat-resistant resin (A) are from 10 to 50% by weight based on the total amount of said heat-resistant resin (A) and thermoplastic resin (B), respectively; the ratio of the imide compound to the total amount of said styrene compound and imide compound is from 5 to 50% by weight; the total amount of a rubber reinforcement used in the rubber-reinforced copolymer of said heat-resistant resin (A) and the butadiene rubber, ethylene-propylene rubber and acrylic ester rubber used in said high-impact resin is from 5 to 35% by weight based on the total amount of said heat-resistant resin (A) and thermoplastic resin (B); the amount of said antimony oxide (C) is from 0.5 to 10 parts by weight per 100 parts by weight of the total amount of said heat-resistant resin (A) and thermoplastic resin (B); the amount of said bromine-containing reaction product (D) is from 5.0 to 40 parts by weight per 100 parts by weight of the total amount of said heat-resistant resin (A) and thermoplastic resin (B); and the amount of said silicon-containing compound (E) is from 0.01 to 15 parts by weight per 100 parts by weight of the total amount of said heat-resistant resin (A) and thermoplastic resin (B).

DETAILED DESCRIPTION OF THE INVENTION (A) Heat-Resistant Resin:

The heat-resistant resin which can be used in the present invention is selected from the group consisting of (1) a copolymer comprising a styrene compound and an α,β-unsaturated dicarboxylic acid imide compound [hereinafter referred to as heat-resistant resin (1)], and (2) a rubber-reinforced copolymer comprising a styrene compound and an α,β-unsaturated dicarboxylic acid imide compound [hereinafter referred to as heat-resistant resin (2)].

The styrene compound to be used as a copolymerization component in the heat-resistant resins (1) and (2) includes styrene and its derivatives including substituted styrenes having on the benzene ring or on the α-carbon of the vinyl group one or more substituents such as a halogen atom (e.g., F, Cl, Br and I) and a straight-chain, branched-chain or alicyclic hydrocarbon group having up to 8 carbon atoms (e.g., methyl, ethyl, isopropyl, n-octyl, cyclohexyl, etc.) which may also be substituted with a halogen atom. Example of the styrene compound include styrene, α-methylstyrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, 2,5-diethylstyrene, 3,5-diethylstyrene, 2,4,5-triethylstyrene, 2,3,4,5-tetraethylstyrene, pentaethylstyrene, o-isopropylstyrene, m-isopropylstyrene, p-isopropylstyrene, p-n-butylstyrene, m-sec-butylstyrene, p-sec-butylstyrene, m-tert-butylstyrene, p-tert-butylstyrene, p-hexylstyrene, p-heptylstyrene, p-octylstyrene, p-sec-amylstyrene, p-sec-hexylstyrene, p-sec-heptylstyrene, p-sec-octylstyrene o-chlorostyrene, m-chlorostyrene, p-chlorostyrene, 2,3-dichlorostyrene, 2,4-dichlorostyrene, 2,5-dichlorostyrene, 2,6-dichlorostyrene, 3,4-dichlorostyrene, 3,5-dichlorostyrene, 2-chloro-5-methylstyrene, 4-chloro-3-methylstyrene, 2-chloro-3,4-dimethylstyrene, 2-chloro-3,5-dimethylstyrene, 4-chloro-2,5-dimethylstyrene, 2,3-dichloro-4,5-dimethylstyrene, trichlorostyrene, 2,4,5-trichlorostyrene, 2,3,4-trichlorostyrene, tetrachlorostyrene, pentachlorostyrene, o-bromostyrene, m-bromostyrene, p-bromostyrene, 2,5-dibromostyrene, 3,4dibromostyrene, 2,4,5-tribromostyrene, 2-bromo-5-methylstyrene, 4-bromo-3-methylstyrene, p-(2-bromoethyl)styrene, o-iodostyrene, m-iodostyrene, p-iodostyrene, o-fluorostyrene, m-fluorostyrene, p-fluorostyrene, 2,4-difluorostyrene, 2,5-difluorostyrene, 4-fluoro-2,5-dichlorostyrene, 5-fluoro-2,4-dichlorostyrene, 2,5-di-fluoro-4-chlorostyrene, pentafluorostyrene, m-trifluoromethylstyrene, 2,5-di(trifluoromethyl)styrene, 2-bromo-4-trifluoromethylstyrene, 2-fluoro-3-trifluoromethylstyrene, 2,4,6-tris(trifluoromethyl)styrene, and p-trifluoromethylstyrene.

The imide compound includes those represented by formula (I):

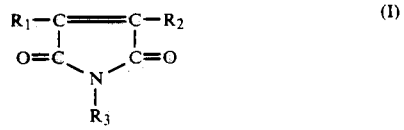

(I)

wherein $R_1$, $R_2$, and $R_3$, which may be the same or different, each represents a hydrogen atom or a hydrocarbon group having up to 12 carbon atom which may be straight-chain, branched-chain, alicyclic or aromatic and which may be substituted with a halogen atom.

Typical examples of the imide compound of formula (I) are maleimide, N-methylmaleimide, N-ethylmaleimide, N-propylmaleimide, N-isopropylmaleimide, N-n-butylmaleimide, N-isobutylmaleimide, N-tert-butylmaleimide, N-hexylmaleimide, N-cyclohexylmaleimide, N-octylmaleimide, N-decylmaleimide, N-dodecylmaleimide, N-benzylmaleimide, N-2-phenylethylmaleimide, N-vinylmaleimide, N-phenylmaleimide, N-(o-tolyl)maleimide, N-(m-tolyl)maleimide, N-(p-tolyl)maleimide, N-(o-ethylphenyl)maleimide, N-(m-ethylphenyl)maleimide, N-(p-ethylphenyl)maleimide, N-(p-dodecylphenyl)maleimide, N-(o-vinylphenyl)maleimide, N-(m-vinylphenyl)maleimide, N-(p-vinylphenyl)maleimide, N-(o-bisphenyl)maleimide, N-(p-bisphenyl)maleimide, N-(o-chlorophenyl)maleimide, N-(p-chlorophenyl)maleimide, N-(o-bromophenyl)maleimide, N-(m-bromophenyl)maleimide, N-(p-bromophenyl)maleimide, and N-laurylmaleimide.

The rubber which can be used as a reinforcement of the heat-resistant resin (2) preferably has a Mooney viscosity ($ML_{1+4}$) of from 10 to 150 at 100° C. and includes a styrene-butadiene copolymer rubber (the styrene content is usually 40% by weight or less), a butadiene homopolymer rubber, a hydrogenated styrene-butadiene copolymer rubber obtained by hydrogenation of the above-described styrene-butadiene copolymer rubber, and an ethylene-propylene copolymer rubber (the ethylene content is usually from 40 to 90% by weight and preferably from 55 to 85% by weight).

The heat-resistant resin (2) can be obtained by graft polymerization of the styrene compound and imide compound to the rubber reinforcement. The rubber is usually used in an amount of from 3 to 20 parts by weight, preferably from 5 to 15 parts by weight, per 100 parts by weight of the heat-resistant resin (2).

Both the heat-resistant resins (1) and (2) can be prepared by commonly employed and well-know processes such as aqueous suspension polymerization, emulsion polymerization, solution polymerization, and bulk polymerization.

In either of the heat-resistant resins (1) and (2), the copolymerization ratio of the imide compound to the total amount of the styrene compound and the imide compound ranges from 5 to 30% by weight, preferably from 10 to 30% by weight, more preferably from 10 to 25% by weight. If it is less than 5%, the resulting resin composition lacks heat resistance. If it exceeds 50%, molding properties are seriously deteriorated.

The copolymer or copolymer component in the heat-resistant resins (1) or (2) may further contain an unsaturated nitrile monomer, e.g., acrylonitrile and methacrylonitrile, or methyl methacrylate usually at a copolymerization ratio of up to 30% by weight.

The heat-resistant resin as the component (A) may be a blend of the heat-resistant resin (2) containing a relatively large proportion of the rubber reinforcement as a master batch with the heat-resistant resin (1).

In the preparation of the heat-resistant resin (A), each of the styrene compound, imide compound, and rubber reinforcement can be used either individually or in combinations of two or more thereof.

(B) Thermoplastic Resin:

The thermoplastic resin which can be used in the present invention is selected from the group consisting of (1) a high-impact resin obtained by graft copolymerizing (i) styrene and acrylonitrile or (ii) styrene and methyl methacrylate to (iii) a rubber selected from the group consisting of a butadiene rubber, an ethylenepropylene rubber and an acrylic ester rubber, and (2) a copolymer of (i) styrene and acrylonitrile or (ii) styrene and methyl methacrylate (hereinafter referred to as a styrene copolymer resin).

(1) High-Impact Resin:

The rubber to be used in the preparation of the high-impact resins is selected from butadiene rubbers including:

a butadiene homopolymer rubber and a random or block copolymer rubber comprising butadiene and a small amount (usually 40% by weight or less) of styrene or acrylonitrile; ethylene-propylene rubbers including a copolymer rubber consisting of ethylene and propylene, and a copolymer rubber consisting of ethylene, propylene, and a small amount (usually 10% by weight or less) of (i) a straight-chain or branched diolefin having the two double bonds in the terminals thereof and preferably having up to 18 carbon atoms (e.g., 1,4-pentadiene, 3-ethyl-1,4-pentadiene, 3-ethyl-3-methyl-1,4-pentadiene, 2,4-dimethyl-1,4-pentadiene, 3,3-dimethyl-1,4-pentadiene, 1H,3H-hexachloro-1,4-pentadiene, 3- isopropyl-2-methyl-1,4-pentadiene, 3-methoxy-1,4-pentadiene, 2-methyl-1,4-pentadiene, 3-methylene-1,4-pentadiene, 1,5-hexadiene, 3-ethyl-2-methyl-1,5-hexadiene, 1,6-heptadiene, 1,7-octadiene and 4,5- diethyl-4,5-dimethyl-1,7-octadiene), (ii) a straight-chain or branched diolefin having one of the double bonds in the terminals thereof and preferably having up to 18 carbon atoms (e.g., 1,4-hexadiene, 1,3-hexadiene, 2-ethyl-1,3-hexadiene, 4-ethyl-1,3-hexadiene, 2-ethyl-3,4-dimethyl-1,3-hexadiene, 2-ethyl-4-methyl,1,3-hexadiene, 2,3,5,5- tetramethyl-1,3-hexadiene, 2,4,5,5- tetramethyl-1,3-hexadiene, 2,3,4-trimethyl-1,3-hexadiene, 2,5,5-trimethyl-1,3-hexadiene, 1,4-hexadiene, 4-ethyl-1,4-hexadiene, 5-methyl-1,4-hexadiene, 1,3-heptadiene, 2-ethyl-1,3-heptadiene, 3-ethyl-1,3-heptadiene, 2-methyl-1,3-heptadiene, 6-methyl-1,3-heptadiene, 2-propyl-1,3-heptadiene, 2,3,6-trimethyl-1,3-heptadiene, 3,5,5-trimethyl-1,3-heptadiene, 1,4-heptadiene, 4-propyl-1,4-heptadiene, 1,5-heptadiene, 4-butyl-1,5-heptadiene, 4-butyl-4-methyl-1,5-heptadiene, 2,4-dimethyl-1,5-heptadiene, 2,6-dimethyl-1,5-heptadiene, 3,4-dimethyl-1,5-heptadiene, 3,6-dimethyl-1,5-heptadiene, 2-methyl-1,5-heptadiene, 3-methyl-1,5-heptadiene, 1,2-octadiene, 1,3-octadiene, 2-methyl-1,3-octadiene, 4-methyl-1,3-octadiene, 1,4-octadiene, 3-ethyl-1,4-octadiene, 5-methyl-1,5-octadiene, 4,5,6-trimethyl-1,5-octadiene, 1,6-octadiene, 3,7-dimethyl-1,6-octadiene, 3,7-dimethyl-3-pentyloxy-1,6-octadiene and 3-heptyloxy-3,7-dimethyl-1,6-octadiene) or (iii) bicyclo[2.2.1]heptene-2 or a derivative thereof (e.g., 5-methylbicyclo[2.2.1]heptene-2, 5,6-trimethylenebicyclo[2.2.1]heptene-2 (exo-form and endo-form), 5-methylenebicyclo[2.2.1]heptene-2 and bicyclo[2.2.1]-hepta-2,5-diene(2,5-norbornadiene) dicyclopentadiene (exo-form and endo-form)); and acrylic ester rubbers including a homopolymer of an acrylic ester such as alkyl acrylates and alkoxyalkyl acrylates (e.g., methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate, dodecyl acrylate, cyanoethyl acrylate, methoxyethyl acrylate, ethoxyethyl acrylate, butoxyethyl acrylate and ethoxypropyl acrylate) and a copolymer consisting of an acrylic ester and a small amount (usually 10% by weight of less) of other monomers such as helogen-containing unsaturated compounds (e.g., vinyl chloroacetate, chloroethyl vinyl ether and allyl chloroacetate), epoxy group-containing unsaturated compounds (e.g., glycidyl acrylate, glycidyl methacrylate, vinyl glycidyl ether, allyl glycidyl ether and methallyl glycidyl ether), amino group-containing esters of unsaturated carboxylic acids (e.g., dimethylaminoethyl methacrylate, diethylaminoethyl methacrylate and dimethylaminoethyl acrylate), amino group-containing amides of unsaturated carboxylic acids (e.g., N-(4-anilinophenyl)acrylamide and N-(anilinophenyl)methacrylamide), and vinyl monomers (e.g., styrene, vinyltoluene, α-methylstyrene, acrylonitrile, methacrylonitrile, cyclohexyl acrylate and cyclohexyl methacrylate).

The rubber to be used in the preparation of the high-impact resins preferably has a Mooney viscosity of from 20 to 140, more preferably from 30 to 120, though it varies depending on the kind. These rubbers are widely produced in industry and utilized in various fields. The processes for preparing them and characteristics and utility thereof are well known in the art [cf. Shu Kanbara, *Gosei Gomu Handbook*, Asakura Shoten (1967)].

The graft polymerization for the preparation of the high-impact resins can be carried out according to bulk polymerization, solution polymerization, emulsion polymerization, aqueous suspension polymerization, and a combination thereof (e.g., bulk polymerization followed by aqueous suspension polymerization). The rubber is usually used in an amount of from 3 to 40 parts, preferably from 5 to 35 parts, more preferably from 5 to 30 parts, by weight per 100 parts by weight of the resulting high-impact resin. The high-impact resin may be obtained by preparing a graft polymer having a high rubber content by using a relatively large amount of the rubber and then mixing the graft polymer with a homo- or copolymer of styrene, acrylonitrile and methyl methacrylate. In this case, the above-recited amount of the rubber is calculated based on the total amount of the blend. The monomers bonded to the rubbery polymer as a grafted side chain (i.e., styrene and acrylonitrile or methyl methacrylate) has a molecular weight of from 1,000 to 300,000, preferably from 2,000 to 200,000. It is generally rare that the graft monomers are completely bonded to the rubbery polymer. The reaction system contains both the grafted polymer and a homo- or copolymer of the monomers remaining unbound to the rubbery polymer. This mixture is used as such without separating the free homo- or copolymer.

Typical examples of the thus prepared high-impact resins include an acrylonitrile-butadiene-styrene terpolymer (ABS resin) obtained by graft polymerization of styrene and acrylonitrile to a butadiene homopolymer rubber, a styrene-butadiene block or random copolymer rubber (SBR) or an acrylonitrile-butadiene copolymer rubber (NBR); a methyl methacrylate-butadiene-styrene terpolymer (MBS resin) obtained by graft polymerization of styrene and methyl methacrylate to a butadiene homopolymer rubber or SBR; an acrylonitrile-acrylic ester-styrene terpolymer (AAS resin) obtained by graft polymerization of acrylonitrile and styrene to an acrylic ester rubber; and a graft copolymer resin (AES resin) obtained by graft polymerization of acrylonitrile and styrene to an ethylene-propylene copolymer rubber.

In the preparation of the high-impact resin, it is possible that styrene and acrylonitrile or methyl methacrylate may be graft polymerized to a relatively large amount (usually 40 to 70% by weight) of the rubber in the same manner as described above to obtain a high-impact resin having a high rubber content (e.g., an acrylonitrile-butadiene-styrene terpolymer resin having a high rubber content) and mixing the graft copolymer with the above-described heat-resistant resin or the styrene copolymer resin hereinafter described so as to have a composition as specified in the present invention.

The above-described high-impact resins are currently produced on an industrial scale and utilized in various fields, and the processes for preparing them are well known in the art.

(2) Styrene Copolymer Resin:

The styrene copolymer resin as the thermoplastic resin (B) includes a styrene-acrylonitrile copolymer resin (AS resin) and a styrene-methyl methacrylate copolymer resin (MS resin). These styrene copolymer resins generally have a styrene content of from 40 to 85% by weight, preferably from 50 to 80% by weight.

The styrene copolymers can be industrially produced in the same polymerization process as the above-described graft polymerization, and are currently utilized in various fields.

(C) Antimony Oxide:

The antimony oxide which can be used in the present invention is widely employed as a flame retarding aid for bromine-containing compounds, and includes antimony trioxide and antimony pentoxide. The antimony oxide has an average particle size of from 1 to 150 μm.

(D) Bromine-Containing Reaction Product:

The bromine-containing reaction product which can be used in the present invention is selected from (1) a bromine-containing compound having a molecular weight of from 1,200 to 6,000 and a bromine content of from 5.0 to 60% by weight, which is obtained by reacting a bromine-containing epoxy compound (1) and 1,3,5-tribromophenol [hereinafter referred to as bromine-containing compound (1)], and (2) a reaction product obtained by reacting a bromine-containing epoxy compound (2) having an epoxy equivalent of from 450 to 7,000 and a bromine content of from 5.0 to 52% by weight and an acrylonitrile-butadiene copolymer having a carboxyl group at the both terminals thereof and having a molecular weight of from 1,000 to 10,000 [hereinafter referred to as bromine-containing compound (2)].

Typically included in the bromine-containing compound (1) are those obtained by reacting a bromine-containing epoxy compound (1) represented by formula (II):

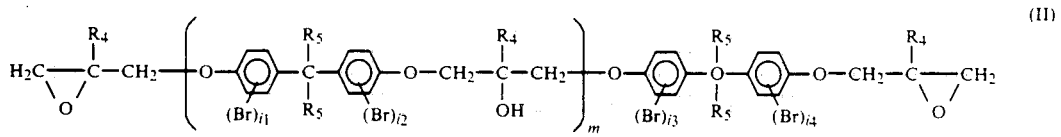

wherein $R_4$ and $R_5$, which may be the same or different, each represents a hydrogen atom or a methyl group; m represents 0 or an integer of from 1 to 7; and $i_1$ to $i_4$ each represents 0 or an integer of from 1 to 4, provided that $i_1$ to $i_4$ are not 0 at the same time, with 1,3,5-tribromophenol, the main component of which is represented by formula (III):

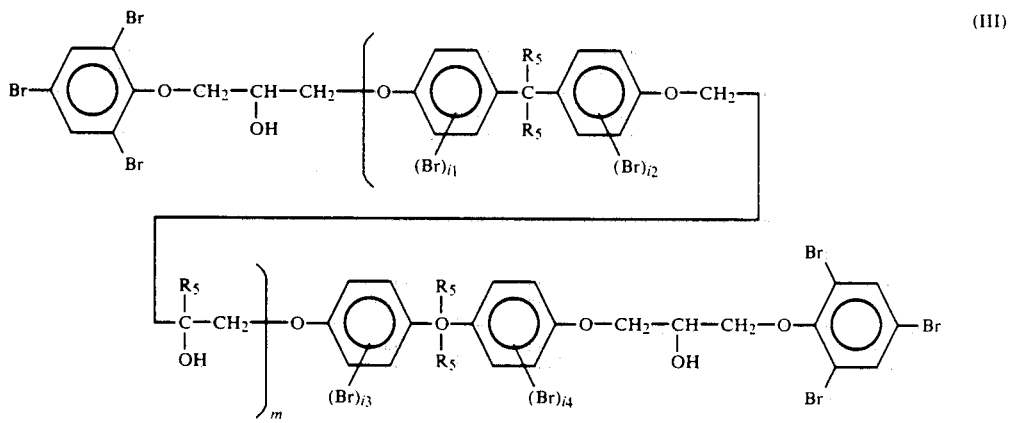

wherein $R^5$, m, and $i_1$ $i_4$ are defined above.

As a result of the reaction, the terminal epoxy groups of the compound of formula (II) are reacted, with the proportion of the unreacted epoxy groups and thus remaining in the product being 15% at the most based on the initial epoxy content.

In formulae (II) and (III), $i_1$ to $i_4$ each is preferably 1 to 4.

The bromine-containing epoxy compound (1) represented by formula (II) can be prepared by reacting 4,4'-dioxydiphenylpropane (bisphenol A) containing at least one bromine atom with epichlorohydrin according to a conventional process for preparing ether type epoxy resins. It can also be prepared by brominating an ether type epoxy resin containing no bromine.

The bromine-containing compound (1) has a molecular weight of from 1,200 to 6,000, preferably from 1,400 to 5,000, and a bromine content of from 5.0 to 60% by weight, preferably from 10 to 60% weight.

The bromine-containing compound (2) can be obtained by reacting a bromine-containing epoxy compound (2) having an epoxy equivalent of from 450 to 7,000 and a bromine content of from 5.0 to 52% by weight with an acrylonitrile-butadiene copolymer having a carboxyl group at the both terminals thereof and having a molecular weight of from 1,000 to 10,000.

The bromine-containing epoxy compound (2) has a bromine content of from 5.0 to 52% by weight, preferably from 7.0 to 52% by weight, more preferably from 10 to 52% by weight. If the bromine content of the epoxy compound (2) is less than 5.0% by weight, the resulting resin composition exhibits insufficient flame retardancy. The bromine-containing epoxy compound (2) has an epoxy equivalent of from 450 to 7,000, preferably from 450 to 6,000, more preferably from 500 to 5,000. If the epoxy equivalent is less than 450, the resin composition exhibits poor heat resistance. On the other hand, if the epoxy equivalent exceeds 7,000, the bromine-containing compound (2) is poor in compatibility with other components, resulting in reduced surface gloss of molded articles of the composition.

The bromine-containing epoxy compound (2) includes those represented by formula (IV):

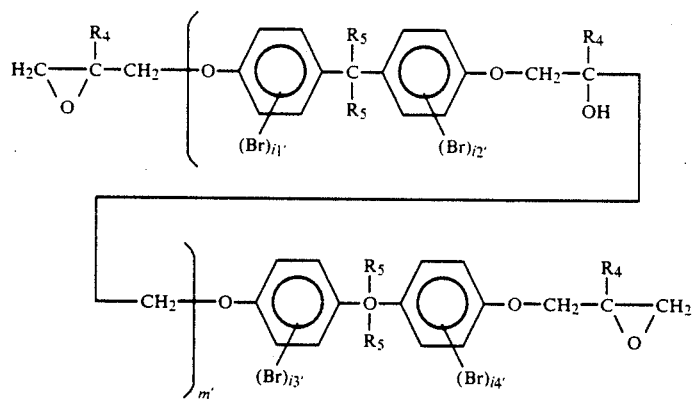

wherein $R_4$ and $R_5$ are as defined above; $m'$ represents 0 or an integer of from 1 to 30; and $i_1'$ to $i_4'$ each represents an integer of from 1 to 4.

The bromine-containing epoxy compound (2) can be obtained by reacting 4,4'-dioxydiphenylpropane (bisphenol A) containing at least one bromine atom with epichlorohydrin according to a known process for preparing ether type epoxy resins. In can also be obtained by reacting an ether type epoxy resin containing no bromine with bromine.

The acrylonitrile-butadiene copolymer having a carboxyl group at the both terminals thereof has a molecular weight of from 1,000 to 10,000, preferably from 1,500 to 8,000, more preferably from 2,000 to 7,000. If the molecular weight is less than 1,000, the resulting resin composition has insufficient impact resistance. An acrylonitrile-butadiene copolymer having a molecular weight exceeding 10,000 lacks compatibility with the above-described bromine-containing epoxy compound. The acrylonitrile-butadiene copolymer has an acrylonitrile content of 40% by weight or less. If the acrylonitrile content exceeds 40%, the copolymer would have a markedly increased viscosity, resulting in difficulty on handling.

In the preparation of the bromine-containing compound (2), the reaction between the bromine-containing epoxy compound (2) and the acrylonitrile-butadiene copolymer having a carboxyl group at the both terminals can be carried out either by heating them in a high temperature or by heating them in the presence of an amine catalyst with or without a solvent.

The amount of the acrylonitrile-butadiene copolymer having a carboxyl group at the both terminals to be reacted usually ranges from 5.0 to 100 parts by weight, preferably from 5.0 to 80 parts by weight, per 100 parts by weight of the bromine-containing epoxy compound (2). If it is less than 5.0 parts, sufficient effects to improve impact resistance cannot be produced. If it exceeds 100 parts, the resulting resin composition lacks heat resistance.

(E) Silicon-Containing Compound:

The silicon-containing compound which can be used in the present invention is selected from the group consisting of a silicone oil, a ladder silicone resin, and an alkoxysilane having a mercapto group, a vinyl group or a methacryloyl group.

The silicone oil to be used has a viscosity usually of from 10 to 100,000 cps, preferably from 50 to 50,000 cps, more preferably from 50 to 20,000 cps, at 25° C. Silicone oils having a viscosity less than 10 cps (at 25° C.) tend to vaporize during keaning. Silicone oils having a viscosity exceeding 10,000 cps (at 25° C.) are poor in compatibility.

Typical examples of such silicone oils include polydimethylsiloxane, polymethylphenylsiloxane, and polymethylhydrogensiloxane. In addition, modified silicone oils obtained by substituting the alkyl group of polydialkylsiloxanes (usually having from 1 to 18 carbon atoms in their alkyl moiety) with epoxy, amino, carboxyl, or alcohol.

The ladder silicon resins can be represented by formula (V):

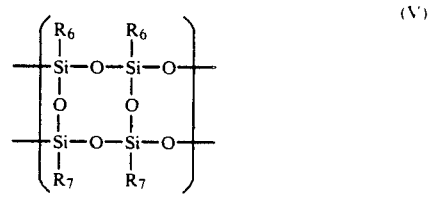

wherein $R_6$ and $R_7$, which may be the same or different, each represents a straight-chain alkyl group having from 1 to 4 carbon atoms, a phenyl group, a hydroxyl group, a carboxyl group or an aminoalkyl group having from 1 to 4 carbon atoms, the total number of the hydroxyl, carboxyl and aminoalkyl groups being not more than 10 mol% based on the number of the groups for $R_6$ and $R_7$; and n represents an integer of from 10 to 100.

The ladder silicone resin may be used in the resin composition either as such or after being preliminarily condensed by heating at 80° to 300° C. for 5 minutes to 1 hour.

The alkoxysilane compound to be used is an alkoxysilane having a functional group selected from the group consisting of a mercapto group, a vinyl group, and a methacryloyl group. Typical examples of the alkoxysilane compound include those represented by formula (VI):

$$Y-\underset{R'_{3-x}}{Si(OR)_x} \quad (VI)$$

wherein R and R', which may be the same or different, each represents a straight-chain or branched alkyl group having from 1 to 6 carbon atoms; Y represents a vinyl group ($CH_2=CH-$), a mercaptoalkyl group represented by formula $HS-R_8-$, wherein $R_8$ represents a straight-chain or branched alkylene group having from 1 to 6 carbon atoms, or a methacryloylalkyl group represented by formula $$CH_2=\underset{CH_3}{\underset{|}{C}}-\underset{O}{\underset{\|}{C}}-O-R_9-,$$

wherein $R_9$ represents a straight chain or branched alkylene group having from 1 to 6 carbon atoms; and x represents 2 or 3.

Specific examples of the alkoxysilane compound of formula (VI) are γ-mercaptopropylmethyldimethoxysilane, γ-mercaptopropyltrimethoxysilane, vinyltrimethoxysilane, vinyltriethoxysilane, vinyltripropoxysilane, γ-methacryloyloxypropyltrimethoxysilane, γ-methacryloyloxypropyltriethoxysilane, γ-methacryloyloxypropyltripropoxysilane, γ-methacryloyloxypropylmethyldiethoxysilane, γ-methaoryloyloxypropylmethyldipropoxysilane, γ-melhacryloyloxypropyltriisopropoxysilane and γ-methacryloyloxypropylmethyldiisopropoxysilane.

The silicon-containing compound (E) reacts with the above-described heat-resistant resin or thermoplastic resin on heating at high temperatures to form an Si-C bond, thereby to prevent the resulting resin composition from dripping.

The silicon-containing compound (E) produces great effects on improvement of flame retardancy and particularly antidripping properties. Such effects become especially conspicuous in a combined use with the above-described bromine-containing reaction product (D).

The amounts of the styrene compound and imide compound in the heat-resistant resins (1) and/or (2) range from 10 to 50% by weight, respectively, based on the total amount of the heat-resistant resin (A) and thermoplastic resin (B) (hereinafter collectively referred to as "high polymers"). If it is outside the above range, the resulting resin composition does not exhibit good heat resistance and good processability at the same time.

The total amount of the rubber reinforcement used in the preparation of the heat-resistant resin (2) and the rubber used in the preparation of the high-impact resin (i.e., butadiene rubbers, ethylenepropylene rubbers and acrylic ester rubbers) (hereinafter collectivelly referred to as "rubber components") ranges from 5 to 35% by weight, preferably from 5 to 30% by weight, more preferably from 5 to 25% by weight, based on the total amount of the high polymers. If the content of the rubber components in the high polymers is less than 5%, the resulting composition lacks impact resistance. If it exceeds 35%, the composition suffers reduction not only in molding properties but also in heat resistance.

The amount of the antimony oxide ranges from 0.5 to 10 parts by weight per 100 parts by weight of the high polymers. If it exceeds 10 parts, the resulting composition shows reduced mechanical strength.

A combined use of the antimony oxide and the bromine-containing reaction product synergistically brings about an improvement on flame retardancy. Manifestation of such a synergistic effect requires use of the antimony oxide in an amount of at least 0.5 part, particularly from 1.0 to 8.0 parts, by weight per 100 parts by weight of the high polymers.

The amount of the bromine-containing reaction product ranges from 5.0 to 40 parts by weight, preferably from 5.0 to 35 parts by weight, per 100 parts by weight of the high polymers. If it is less than 50. parts, the resulting resin composition fails to exhibit sufficient flame retardancy. Use of the bromine-containing reaction product in amounts exceeding 40 parts not only increases the cost incurred but also results in insufficiency of impact resistance.

It is preferable to use from 1 to 5 parts by weight of the bromine-containing reaction product per part by weight of the antimony oxide.

The amount of the silicon-containing compound to be used varies depending on the kind but usually ranges from 0.01 to 15 parts by weight per 100 parts by weight of the high polymers.

In more detail, in case of the silicone oil, it is preferably used in an amount of from 0.1 to 3.0 parts, more preferably from 0.1 to 2.5 parts, by weight per 100 parts by weight of the high polymers. If the amount of the silicone oil is less than 0.1 part, the effect of drip prevention cannot be fully enjoyed. Use of more than 3.0 parts of the silicone oil tends to cause slippage during preparation of the composition and also to reduce heat resistance of the composition.

In the case of the ladder silicone resin, it is preferably used in an amount of from 0.01 to 15 parts, more preferably from 0.1 to 2.5 parts, by weight per 100 parts by weight of the high polymers. If its amount is less than 0.01 part, the effect of drip prevention is insufficient. Use of more than 15 parts of the ladder silicone resin deteriorates compatibility with the high polymers to reduce mechanical strength of the resulting products.

In the case of the alkoxysilane compound, it is preferably used in an amount of from 0.1 to 5.0 parts, more preferably from 0.2 to 2.5 parts, by weight per 100 parts by weight of the high polymers. If its amount is less than 0.1 part, the effect of drip prevention is insufficient. Use of more than 5.0 parts may cause gelation.

The resin composition of the present invention can be prepared by uniformly mixing the high polymers [i.e., the heat-resistant resin (A) and the thermoplastic resin (B)], antimony oxide (C), bromine-containing reaction product (D), and silicon-containing compound (E). If desired, the composition may further contain additives widely employed in the field of the above-described high polymers according to the end use, such as stabilizers to heat, oxygen and light, fillers, coloring materials, lubricants, plasticizers, and antistatic agents, as long as the purposed characteristics of the composition are not essentially impaired.

In carrying out mixing of the components, all the components may be mixed simultaneously, or part of the components may be mixed in advance and the rest of the components are mixed therewith. The mixing can be carried out by dry blending be the use of a mixing machine commonly employed in the art, e.g., a Henschel mixer; or melt kneading by the use of an open roll, an extruder, a kneader, a Banbury mixer, etc. In order to ensure uniformity of the composition, two or more of these mixing modes can be combined. For example, dry blending may be followed by melt kneading. In any case of combining two or more of the dry blending modes or melt kneading modes, it is preferable that the resulting resin mixture be pelletized by means of a pelletizer for use in the subsequent molding step.

When the components are mixed by melt kneading or when the composition is molded by the molding methods hereinafter described, such should be effected at a temperature at which the high polymers used are melted. It should be noted, however, that the melt kneading temperature or molding temperature must be 280° C. or lower since the high polymers would undergo thermal decomposition or deterioration, or the bromine-containing reaction product would undergo decomposition at higher temperatures.

The composition of the present invention can be molded into any desired shape by various molding methods generally applied in the art, such as injection molding, extrusion molding, compression molding, and blow molding. Further, the composition may be once molded into sheet by the use of an extrusion molding apparatus and then formed into a desired shape by vacuum forming, pressure forming or the like forming technique.

The present invention is now illustrated in greater detail by way of the following Examples and Comparative Examples, but it should be understood that the present invention is not deemed to be limited thereto.

In these examples, physical properties of the compositions were measured or evaluated as follows.

(1) Melt Flow Index (MI):

Measured at 250° C. under a load of 5 kg in accordance with ASTM D1238.

(2) Tensile Yield Strength:

Dumbbell specimens (ASTM No. 1) were used. Measured at a strain rate of 5 mm/min in accordance with ASTM D638.

(3) Izod Impact Strength:

Measured on notched specimens at 23° C. in accordance with ASTM D256.

(4) Heat Resistance:

Changes of samples on standing on a press at 250° C. for 60 minutes were observed in accordance with ASTM D648.

(5) Flame Retardancy:

1.6 mm (1/16 in)-thick specimens were used subjected to frame retardancy test in accordance with UL94.

The kinds and physical properties of the components used in the examples and processes for preparing them are described below.

(A) Heat-Resistant Resin:

(a) In a 10 l autoclave were charged 6,000 g of water, 2,400 g of styrene (ST), 800 g of acrylonitrile (AN), and 800 g of N-phenylmaleimide (N-PMI). In the autoclave were further put 8 g of lauryl peroxide and 9.6 g of t-butyl peroxylaurate as initiators, 8 g of t-dodecylmercaptan as a chain transfer agent, and 20 g of calcium tertiary phosphate and 0.3 g of sodium dodecylbenzenesulfonate as suspension stabilizers. The mixture was heated at 80° C. for 2 hours while stirring to effect polymerization. The temperature of the system was raised to 120° C., at which the polymerization was further continued for an additional period of 3 hours, followed by allowing to cool to room temperature. There was obtained about 3,500 g of a pale yellow powder. This product is hereinafter designated as heat-resistant resin (a).

Infrared absorption analysis (solution method) revealed that the powder is a terpolymer consisting of ST, AN, and N-PMI at a weight ratio of 60:20:20. The heat-resistant resin (a) had an intrinsic viscosity $[\eta]$ of 0.950 (as measured at 30° C. in chloroform in a concentration of 0.05 g/50 ml, hereinafter the same) and a heat distortion temperature of 118° C. (as measured under a load of 264 psi according to ASTM D648 hereinafter the same).

(b) To a monomer mixture of 2,400 g of ST, 800 g of AN, and 800 g of N-PMI was added 280 g of a butadiene homopolymer rubber having a Mooney viscosity of 35 ($ML_{1+4}$, 100° C.) and completely dissolved therein. The mixture was allowed to polymerize at 110° C. for 2.5 hours. The resulting mixture containing the prepolymer produced was added to 6,000 g of water containing the same amounts of the same initiator, chain transfer agent and suspension stabilizer as used in the preparation of the heat-resistant resin (a) to effect aqueous suspension polymerization at 80° C. for 2 hours. The temperature of the polymerization system was raised to 120° C., at which the aqueous suspension polymerization was continued for an additional period of 3 hours, followed by allowing to cool to room temperature. There was obtained about 3,300 g of a yellow powder.

The powder was analyzed in the same manner as for the heat-resistant resin (a) and, as a result, found to be a graft polymer in which the monomers were grafted to the butadiene homopolymer rubber at the same monomer unit weight ratio as in the heat-resistant resin (a). This powder was designated as heat-resistant resin (b). The heat-resistant resin (b) had an intrinsic viscosity $[\eta]$ of 0.850 and a heat distortion temperature of 108° C.

(B) Thermoplastic Resin:

(a) High-Impact Resin:

An acrylonitrile-butadiene-styrene terpolymer (ABS), a methyl methacrylate-butadiene-styrene terpolymer (MBS), an acrylonitrile-acrylic ester rubber-styrene copolymer (AAS), and an acrylonitrile-olefin rubber(ethylene-propylene rubber)-styrene copolymer (AES) were prepared in the same manner as for the ABS resin, MBS rein, AAS resin, and AES resin as used in the Examples and Comparative Examples of JP-A-58-134144 (the term "JP-A" means an "unexamined published Japanese patent application").

(b) Styrene Copolymer Resin:

An acrylonitrile-styrene copolymer having an acrylonitrile content of 23% by weight and an average degree of polymerization of about 750 (hereinafter abbreviated as "AS") and a methyl methacrylate-styrene copolymer having a methyl methacrylate content of 25% by weight and an average degree of polymerization of about 800 (hereinafter abbreviated as "MS") were used.

(C) Antimony Oxide:

Antimony trioxide ($Sb_2O_3$) was used.

(D) Bromine-Containing Reaction Product:

(a) Bromine-Containing Compound (1):

A bromine-containing reaction product of formula (III) wherein $R_4$ is a hydrogen atom and $R_5$ is a methyl group, having an average molecular weight of about 2,000 and a bromine content of 56% by weight [hereinafter referred to as "bromine-containing compound (A)"] and a bromine-containing reaction product which is the same as the bromine-containing compound (A) except for having a bromine content of 55% by weight and an average molecular weight of about 3,600 [hereinafter referred to as "bromine-containing compound (B)"] were used.

(b) Bromine-Containing Compound (2):

A thousand grams of a bromine-containing epoxy represented by formula (IV) wherein $R_4$ is a hydrogen and $R_5$ is a methyl group, having a bromine content of 52% by weight and an average epoxy equivalent of 1,500, and 200 g of an acrylonitrile-butadiene copolymer having an acrylonitrile content of 17% by weight and an average molecular weight of 3,500 and having a carboxyl group at the both terminals thereof were uniformly dissolved in 2,000 g of cellosolve acetate while stirring. To the mixed solution was added 0.5 g of imidazole, and the temperature was elevated to 150° C. to effect reaction for 4 hours while stirring. The solvent was removed from the reaction solution by evaporation, and the residue was dried in vacuo to obtain 1,150 g of a pale brown powder [hereinafter referred to as "bromine-containing compound (C)"].

For comparison, decabromobiphenyl ether [hereinafter referred to as "bromine-containing compound (D)"] and the same bromine-containing epoxy compound as used in the preparation of the bromine-containing compound (C) [hereinafter referred to as "bromine-containing compound (E)"] were used.

(E) Silicon-Containing Compound:

(a) Silicone Oil:

Polydimethylsilicone oil having a viscosity of 5,000 cps (as measured at 25° C., hereinafter the same) [hereinafter referred to as "Si(1)"], polymethylphenylsilicone oil having a viscosity of 1,000 cps [hereinafter referred to as "Si(2)"], polymethylhydrogensilicone oil having a viscosity of 1,000 cps [hereinafter referred to as "Si(3)"], epoxysilicone oil having a viscosity of 1,000 cps [hereinafter referred to as "Si(4)"], and aminosilicone oil having a viscosity of 600 cps [hereinafter referred to as "Si(5)"] were used.

(b) Ladder Silicone Resin:

A ladder silicone resin represented by formula (V) wherein $R_6$ and $R_7$ each represents a methyl group having a molecular weight of about 4,000 [hereinafter referred to as "Si resin (1)"], a silicone resin of formula (V) wherein $R_6$ and $R_7$ each represents a methyl group or a phenyl group with the methyl to phenyl molar ratio being 1:1 and having a molecular weight of about 3,500 [hereinafter referred to as "Si resin (2)"], and a silicone resin of formula (V) wherein $R_6$ and $R_7$ each represents a phenyl group having a molecular weight of about 3,000 [hereinafter referred to as "Si resin (3)"] were used. Each of these silicone resins was heated at 150° C. for 30 minutes and ground, and the undersize of a 200 mesh was used.

(c) Alkoxysilane Compound:

Vinyltrimethoxysilane [hereinafter referred to as "silane (1)"], γ-mercaptopropyltrimethoxysilane [hereinafter referred to as "silane (2)"], γ-mercaptopropylmethyldimethoxysilane [hereinafter referred to as "silane (3)"], and γ-methacryloyloxypropyltrimethoxysilane [hereinafter referred to as "silane (4)"] were used.

EXAMPLES 1 TO 11 AND COMPARATIVE EXAMPLES 1 TO 4

The heat-resistant resin, thermoplastic resin, bromine-containing compound, and silicone-containing compound, the amount and the kind of which are indicated in Table 1, $Sb_2O_3$ (antimony oxide) of the amount indicated in Table 1, and, as a stabilizer, 0.2 part by weight of 2,6-di-t-butyl-p-cresol were dry blended in a Henschel mixer for 5 minutes. The resulting mixture was kneaded and pelletized by means of a vented twin-screw extruder (diameter: 30 mm). The temperature was set at 200° C. at the cylinder 1, 220° C. at the cylinder 2, 240° C. at the cylinder 3, 240° C. at the adaptor, and 230° C. at the die.

The resulting composition (pellets) were determined for MI, tensile yield strength, Izod impact strength (notched), and heat distortion temperature and evaluated for flame retardancy and heat resistance. The results obtained are shown in Table 2.

TABLE 1

| Example No. | Heat-Resistant Resin Kind | Amount (part) | Thermoplastic Resin Kind | Amount (part) | Amount of $Sb_2O_3$ (part) | Bromine-Containing Compound Kind | Amount (part) | Si-Containing Compound Kind | Amount (part) |
|---|---|---|---|---|---|---|---|---|---|
| Example 1 | heat-resistant resin (a) | 70 | ABS | 30 | 6.0 | bromine-containing compound (A) | 18 | Si(1) | 0.4 |
| Example 2 | heat-resistant resin (a) | 50 | ABS¹ | " | " | bromine-containing compound (A) | " | " | " |
| Example 3 | heat-resistant resin (a) | 70 | AES | " | " | bromine-containing compound (A) | " | " | " |
| Example 4 | heat-resistant resin (a) | " | MBS | " | " | bromine-containing compound (A) | " | " | " |
| Example 5 | heat-resistant resin (a) | " | AAS | " | " | bromine-containing compound (A) | " | " | " |
| Example 6 | heat-resistant resin (b) | 80 | ABS | 20 | " | bromine-containing compound (A) | " | " | " |
| Example 7 | heat-resistant resin (a) | 70 | " | 30 | " | bromine-containing compound (B) | " | " | " |
| Example 8 | heat-resistant resin (a) | " | " | " | " | bromine-containing compound (A) | " | Si(2) | " |
| Example 9 | heat-resistant | " | " | " | " | bromine-containing | " | Si(3) | " |

TABLE 1-continued

| Example No. | Heat-Resistant Resin Kind | Amount (part) | Thermoplastic Resin Kind | Amount (part) | Amount of Sb₂O₃ (part) | Bromine-Containing Compound Kind | Amount (part) | Si-Containing Compound Kind | Amount (part) |
|---|---|---|---|---|---|---|---|---|---|
| Example 10 | heat-resistant resin (a) | " | " | " | " | bromine-containing compound (A) | " | Si(4) | " |
| Example 11 | heat-resistant resin (a) | " | " | " | " | bromine-containing compound (A) | " | Si(5) | " |
| Comparative Example 1 | heat-resistant resin (a) | " | " | " | " | bromine-containing compound (A) | " | — | — |
| Comparative Example 2 | heat-resistant resin (a) | " | " | " | " | bromine-containing compound (D) | " | Si(1) | 0.4 |
| Comparative Example 3 | heat-resistant resin (a) | 50 | ABS¹ | 30 | 6.0 | bromine-containing compound (A) | 3.0 | Si(1) | 0.4 |
| Comparative Example 4 | heat-resistant resin (b) | 80 | ABS | 20 | 0.1 | bromine-containing compound (A) | 18 | " | " |
| Example 12 | heat-resistant resin (a) | 70 | " | 30 | 6.0 | bromine-containing compound (A) | " | Si resin (1) | 2.0 |
| Example 13 | heat-resistant resin (a) | 50 | ABS¹ | " | " | bromine-containing compound (A) | " | " | " |
| Example 14 | heat-resistant resin (a) | 70 | AES | " | " | bromine-containing compound (A) | " | " | " |
| Example 15 | heat-resistant resin (a) | " | MBS | " | " | bromine-containing compound (A) | " | " | " |
| Example 16 | heat-resistant resin (a) | " | AAS | " | " | bromine-containing compound (A) | " | " | " |
| Example 17 | heat-resistant resin (b) | 80 | ABS | 20 | " | bromine-containing compound (A) | " | " | " |
| Example 18 | heat-resistant resin (a) | 70 | " | 30 | " | bromine-containing compound (B) | " | " | " |
| Example 19 | heat-resistant resin (a) | " | " | " | " | bromine-containing compound (A) | " | Si Resin (2) | " |
| Example 20 | heat-resistant resin (a) | " | " | " | " | bromine-containing compound (A) | " | Si resin (3) | " |
| Comparative Example 5 | heat-resistant resin (a) | " | " | " | " | bromine-containing compound (A) | " | — | — |
| Comparative Example 6 | heat-resistant resin (a) | " | " | " | " | bromine-containing compound (D) | " | Si resin (1) | 2.0 |
| Comparative Example 7 | heat-resistant resin (a) | 50 | ABS¹ | 30 | 6.0 | bromine-containing compound (A) | 3.0 | Si resin (1) | 2.0 |
| Comparative Example 8 | heat-resistant resin (b) | 80 | ABS | 20 | 0.1 | bromine-containing compound (A) | 18 | — | — |
| Example 21 | heat-resistant resin (a) | 70 | ABS | 30 | 6.0 | bromine-containing compound (A) | 18 | silane (1) | 0.4 |
| Example 22 | heat-resistant resin (a) | 50 | ABS¹ | " | " | bromine-containing compound (A) | " | " | " |
| Example 23 | heat-resistant resin (a) | 70 | AES | " | " | bromine-containing compound (A) | " | " | " |
| Example 24 | heat-resistant resin (a) | " | MBS | " | " | bromine-containing compound (A) | " | " | " |
| Example 25 | heat-resistant resin (a) | " | AAS | " | " | bromine-containing compound (A) | " | " | " |
| Example 26 | heat-resistant resin (b) | 80 | ABS | 20 | " | bromine-containing compound (A) | " | " | " |
| Example 27 | heat-resistant resin (a) | 70 | " | 30 | " | bromine-containing compound (B) | " | " | " |
| Example 28 | heat-resistant resin (a) | " | " | " | " | bromine-containing compound (A) | " | silane (2) | " |
| Example 29 | heat-resistant resin (a) | " | " | " | " | bromine-containing compound (A) | " | silane (3) | " |
| Example 30 | heat-resistant resin (a) | " | " | " | " | bromine-containing compound (A) | " | silane (4) | " |
| Comparative Example 9 | heat-resistant resin (a) | " | " | " | " | bromine-containing compound (A) | " | — | — |
| Comparative Example 10 | heat-resistant resin (a) | 70 | ABS | 30 | 6.0 | bromine-containing compound (D) | 18 | silane (1) | 0.4 |
| Comparative Example 11 | heat-resistant resin (a) | 50 | ABS¹ | " | " | bromine-containing compound (A) | 3.0 | " | " |
| Comparative Example 12 | heat-resistant resin (b) | 80 | ABS | 20 | 0.1 | bromine-containing compound (A) | 18 | " | " |
| Example 31 | heat-resistant resin (a) | 70 | " | 30 | 6.0 | bromine-containing compound (C) | 20 | silane (2) | " |
| Example 32 | heat-resistant resin (a) | 50 | ABS¹ | " | " | bromine-containing compound (C) | " | " | " |
| Example 33 | heat-resistant resin (a) | 70 | ABS | " | " | bromine-containing compound (C) | " | " | 2.0 |
| Example 34 | heat-resistant resin (b) | 80 | AS | 20 | " | bromine-containing compound (C) | " | " | 0.4 |
| Example 35 | heat-resistant resin (b) | " | MS | " | " | bromine-containing compound (C) | " | " | " |
| Example 36 | heat-resistant resin (b) | " | AS | " | " | bromine-containing compound (C) | 30 | " | " |

TABLE 1-continued

| Example No. | Heat-Resistant Resin Kind | Amount (part) | Thermoplastic Resin Kind | Amount (part) | Amount of Sb$_2$O$_3$ (part) | Bromine-Containing Compound Kind | Amount (part) | Si-Containing Compound Kind | Amount (part) |
|---|---|---|---|---|---|---|---|---|---|
| Example 37 | heat-resistant resin (a) | 70 | ABS | 30 | " | bromine-containing compound (C) | 20 | silane (3) | " |
| Example 38 | heat-resistant resin (a) | " | " | " | " | bromine-containing compound (C) | " | silane (4) | " |
| Example 39 | heat-resistant resin (a) | " | " | " | " | bromine-containing compound (C) | " | silane (1) | " |
| Example 40 | heat-resistant resin (a) | " | AAS | " | " | bromine-containing compound (C) | " | silane (2) | " |
| Example 41 | heat-resistant resin (a) | " | AES | " | " | bromine-containing compound (C) | " | " | " |
| Example 42 | heat-resistant resin (a) | 70 | MBS | 30 | 6.0 | bromine-containing compound (C) | 20 | silane (2) | 0.4 |
| Comparative Example 13 | heat-resistant resin (a) | " | ABS | " | " | bromine-containing compound (C) | " | — | — |
| Comparative Example 14 | heat-resistant resin (a) | " | " | " | " | bromine-containing compound (D) | " | silane (2) | 0.4 |
| Comparative Example 15 | heat-resistant resin (a) | " | " | " | " | bromine-containing compound (E) | " | " | " |
| Comparative Example 16 | heat-resistant resin (b) | 80 | AS | 20 | " | bromine-containing compound (C) | 3.0 | " | " |
| Comparative Example 17 | heat-resistant resin (b) | " | " | " | 0.2 | bromine-containing compound (C) | 20 | " | " |
| Comparative Example 18 | heat-resistant resin (b) | " | " | " | 15 | bromine-containing compound (C) | " | " | " |
| Example 43 | heat-resistant resin (a) | 70 | ABS | 30 | 6.0 | bromine-containing compound (C) | " | Si(1) | 0.4 |
| Example 44 | heat-resistant resin (a) | 50 | ABS[1] | " | " | bromine-containing compound (C) | " | " | " |
| Example 45 | heat-resistant resin (a) | 70 | ABS | " | " | bromine-containing compound (C) | " | " | 2.0 |
| Example 46 | heat-resistant resin (b) | 80 | AS | 20 | " | bromine-containing compound (C) | " | " | 0.4 |
| Example 47 | heat-resistant resin (b) | " | MS | " | " | bromine-containing compound (C) | " | " | " |
| Example 48 | heat-resistant resin (b) | " | AS | " | " | bromine-containing compound (C) | 30 | " | " |
| Example 49 | heat-resistant resin (a) | 70 | ABS | 30 | 6.0 | bromine-containing compound (C) | 20 | Si(3) | 0.4 |
| Example 50 | heat-resistant resin (a) | " | " | " | " | bromine-containing compound (C) | " | Si(5) | " |
| Example 51 | heat-resistant resin (a) | " | " | " | " | bromine-containing compound (C) | " | Si resin (1) | " |
| Example 52 | heat-resistant resin (a) | " | " | " | " | bromine-containing compound (C) | " | Si resin (2) | " |
| Example 53 | heat-resistant resin (a) | " | " | " | " | bromine-containing compound (C) | " | Si resin (3) | " |
| Example 54 | heat-resistant resin (a) | " | AAS | " | " | bromine-containing compound (C) | " | Si (1) | " |
| Example 55 | heat-resistant resin (a) | " | AES | " | " | bromine-containing compound (C) | " | " | " |
| Example 56 | heat-resistant resin (a) | " | MBS | " | " | bromine-containing compound (C) | " | " | " |
| Comparative Example 19 | heat-resistant resin (a) | " | ABS | " | " | bromine-containing compound (C) | " | — | — |
| Comparative Example 20 | heat-resistant resin (a) | " | " | " | " | bromine-containing compound (D) | " | Si(1) | 0.4 |
| Comparative Example 21 | heat-resistant resin (a) | " | " | " | " | bromine-containing compound (E) | " | " | " |
| Comparative Example 22 | heat-resistant resin (b) | 80 | AS | 20 | " | bromine-containing compound (C) | 3.0 | " | " |
| Comparative Example 23 | heat-resistant resin (b) | " | " | " | 0.2 | bromine-containing compound (C) | 20 | " | " |
| Comparative Example 24 | heat-resistant resin (b) | " | " | " | 15 | bromine-containing compound (C) | " | " | " |

Note:
[1]Additionally containing 20 parts by weight of AS.

TABLE 2

| Example No. | MI (g/10 min) | Heat Distortion Temperature (°C.) | Izod Impact Strength (notched) (kg · cm/cm) | Tensile Yield Strength (kg/cm$^2$) | Flame Retardancy | Heat Resistance |
|---|---|---|---|---|---|---|
| Example 1 | 12.5 | 109.4 | 10.3 | 380 | V-0 | no color change |
| Example 2 | 19.1 | 104.5 | 16.4 | 350 | " | no color change |
| Example 3 | 11.2 | 108.5 | 10.7 | 370 | " | no color |

TABLE 2-continued

| Example No. | MI (g/10 min) | Heat Distortion Temperature (°C.) | Izod Impact Strength (notched) (kg · cm/cm) | Tensile Yield Strength (kg/cm$^2$) | Flame Retardancy | Heat Resistance |
|---|---|---|---|---|---|---|
| Example 4 | 12.1 | 108.6 | 10.5 | 370 | " | no color change |
| Example 5 | 11.4 | 108.2 | 10.9 | 380 | " | no color change |
| Example 6 | 12.1 | 104.2 | 19.2 | 340 | " | no color change |
| Example 7 | 8.8 | 110.5 | 7.4 | 390 | " | no color change |
| Example 8 | 12.4 | 109.2 | 10.3 | 380 | " | no color change |
| Example 9 | 12.0 | 109.6 | 10.6 | 380 | " | no color change |
| Example 10 | 12.1 | 109.5 | 10.5 | 380 | " | no color change |
| Example 11 | 12.2 | 109.8 | 10.6 | 380 | " | no color change |
| Comparative Example 1 | 10.8 | 109.1 | 4.4 | 370 | V-2 | no color change |
| Comparative Example 2 | 5.1 | 110.9 | 2.7 | —$^2$ | V-0 | change to brown |
| Comparative Example 3 | 8.4 | 105.7 | 16.2 | 380 | H-B | no color change |
| Comparative Example 4 | 11.0 | 104.1 | 19.5 | 350 | H-B | no color change |
| Example 12 | 10.9 | 110.0 | 9.7 | 380 | V-0 | no color change |
| Example 13 | 17.0 | 105.1 | 16.0 | 350 | " | no color change |
| Example 14 | 9.7 | 109.5 | 9.7 | 370 | " | no color change |
| Example 15 | 10.2 | 109.7 | 9.8 | 370 | " | no color change |
| Example 16 | 9.6 | 109.6 | 9.7 | 380 | " | no color change |
| Example 17 | 10.0 | 105.0 | 17.4 | 340 | " | no color change |
| Example 18 | 7.2 | 111.8 | 7.3 | 390 | " | no color change |
| Example 19 | 10.8 | 110.1 | 9.7 | 380 | " | no color change |
| Example 20 | 10.9 | 110.1 | 9.8 | 380 | " | no color change |
| Comparative Example 5 | 10.8 | 109.1 | 4.4 | 370 | V-2 | no color change |
| Comparative Example 6 | 5.1 | 111.2 | 2.6 | —$^2$ | V-0 | change to brown |
| Comparative Example 7 | 8.0 | 104.9 | 16.5 | 380 | H-B | no change |
| Comparative Example 8 | 10.5 | 104.5 | 19.2 | 340 | H-B | no change |
| Example 21 | 11.2 | 109.5 | 10.1 | 380 | V-0 | no change |
| Example 22 | 18.3 | 104.7 | 10.3 | 350 | V-0 | no color change |
| Example 23 | 10.0 | 108.7 | 10.6 | 370 | " | no color change |
| Example 24 | 10.5 | 109.0 | 10.4 | 370 | " | no color change |
| Example 25 | 9.9 | 108.9 | 10.7 | 380 | " | no color change |
| Example 26 | 10.2 | 104.6 | 18.1 | 340 | " | no color change |
| Example 27 | 7.5 | 110.8 | 7.9 | 390 | " | no color change |
| Example 28 | 11.5 | 109.3 | 10.1 | 380 | " | no color change |
| Example 29 | 11.4 | 109.3 | 9.8 | 380 | " | no color change |
| Example 30 | 11.1 | 109.8 | 10.2 | 380 | " | no color change |
| Comparative Example 9 | 10.8 | 109.1 | 4.4 | 370 | V-2 | no color change |
| Comparative Example 10 | 5.1 | 111.2 | 2.6 | —$^2$ | V-0 | change to brown |
| Comparative Example 11 | 8.3 | 105.8 | 16.3 | 380 | H-B | no color change |
| Comparative Example 12 | 11.0 | 104.3 | 19.7 | 340 | " | no color change |
| Example 31 | 8.0 | 110.4 | 12.6 | 390 | V-0 | no color change |

TABLE 2-continued

| Example No. | MI (g/10 min) | Heat Distortion Temperature (°C.) | Izod Impact Strength (notched) (kg·cm/cm) | Tensile Yield Strength (kg/cm²) | Flame Retardancy | Heat Resistance |
|---|---|---|---|---|---|---|
| Example 32 | 12.5 | 106.7 | 18.6 | 360 | V-0 | no color change |
| Example 33 | 8.4 | 109.8 | 12.0 | 380 | " | no color change |
| Example 34 | 11.7 | 106.5 | 18.8 | 360 | " | no color change |
| Example 35 | 11.5 | 106.7 | 16.1 | 360 | " | no color change |
| Example 36 | 11.6 | 106.4 | 14.0 | 350 | " | no color change |
| Example 37 | 8.1 | 109.9 | 12.8 | 390 | " | no color change |
| Example 38 | 8.4 | 109.0 | 12.6 | 390 | " | no color change |
| Example 39 | 8.5 | 109.5 | 12.7 | 400 | " | no color change |
| Example 40 | 8.0 | 110.2 | 11.9 | 390 | " | no color change |
| Example 41 | 9.4 | 110.1 | 11.9 | 390 | " | no color change |
| Example 42 | 9.6 | 109.6 | 12.0 | 390 | " | no color change |
| Comparative Example 13 | 8.0 | 108.9 | 10.8 | 390 | V-2 | no color change |
| Comparative Example 14 | 6.7 | 110.2 | 2.6 | —[2] | V-0 | change to brown |
| Comparative Example 15 | 8.6 | 110.1 | 8.3 | 390 | " | no color change |
| Comparative Example 16 | 10.6 | 106.1 | 16.7 | 390 | H-B | no color change |
| Comparative Example 17 | 10.9 | 106.0 | 18.0 | 390 | " | no color change |
| Comparative Example 18 | 3.0 | 106.9 | 1.9 | —[2] | V-0 | no color change |
| Example 43 | 8.5 | 109.2 | 12.5 | 400 | " | no color change |
| Example 44 | 12.6 | 107.1 | 18.2 | 360 | " | no color change |
| Example 45 | 9.4 | 108.8 | 12.8 | 380 | " | no color change |
| Example 46 | 11.1 | 106.3 | 18.6 | 360 | " | no color change |
| Example 47 | 10.7 | 106.7 | 16.1 | 360 | " | no color change |
| Example 48 | 11.0 | 106.0 | 14.2 | 350 | " | no color change |
| Example 49 | 8.6 | 109.3 | 13.0 | 400 | " | no color change |
| Example 50 | 8.6 | 109.5 | 13.5 | 400 | " | no color change |
| Example 51 | 8.1 | 109.2 | 12.2 | 390 | " | no color change |
| Example 52 | 8.2 | 109.1 | 12.0 | 390 | " | no color change |
| Example 53 | 8.0 | 109.0 | 13.0 | 390 | " | no color change |
| Example 54 | 6.3 | 109.0 | 12.5 | 400 | " | no color change |
| Example 55 | 6.8 | 110.3 | 12.4 | 400 | " | no color change |
| Example 56 | 6.5 | 110.1 | 12.2 | 400 | V-0 | no color change |
| Comparative Example 19 | 8.0 | 108.5 | 10 | 380 | V-2 | no color change |
| Comparative Example 20 | 5.9 | 109.8 | 2.5 | —[2] | V-0 | change to brown |
| Comparative Example 21 | 8.2 | 109.6 | 8.3 | 390 | " | no color change |
| Comparative Example 22 | 11.5 | 105.8 | 16.7 | 380 | H-B | no color change |
| Comparative Example 23 | 12.0 | 105.7 | 17.6 | 380 | " | no color change |
| Comparative Example 24 | 3.6 | 107.1 | 1.9 | —[2] | V-0 | no color change |

Note:
[2]No yield.

It is apparent from the results of Table 2 that the resin compositions according to the present invention are excellent in not only flame retardancy and impact resistance but also heat resistance.

According to the present invention, a combined use of the bromine-containing reaction product and the silicon-containing compound provides a resin composition having well-balanced physical properties. Such a combination also brings about improvements on flame retardancy and particularly antidripping properties.

In addition to the superiority in flame retardancy, impact resistance and heat resistance, the resin composition of the present invention is further characterized by its excellent molding properties (i.e., fluidity) and capability of providing molding articles having satisfactory gloss, excellent weather resistance, and freedom from color change.

Because of these excellent characteristics, the resin composition of the present invention can be used in a broad range of application, such as TV cabinets, housings of facsimiles, word processors, microcomputers, printers, etc., parts of various fire alarms, and housings of appliances.

While the invention has been described in detail and with reference to specific embodiments thereof, it will be apparent to one skilled in the art that various changes and modifications can be made therein without departing from the spirit and scope thereof.

What is claimed is:

1. A resin composition comprising:
   (A) at least one heat-resistant resin selected from group consisting of (1) a copolymer comprising a styrene compound and an $\alpha,\beta$-unsaturated dicarboxylic acid imide compound and (2) a rubber-reinforced copolymer comprising a styrene compound and an $\alpha,\beta$-unsaturated dicarboxylic acid imide compound,
   (B) at least one thermoplastic resin selected from the group consisting of (1) a high-impact resin obtained by graft-copolymerizing (i) styrene and acrylonitrile or (ii) styrene and methyl methacrylate to (iii) a butadiene rubber, an ethylene-propylene rubber or an acrylic ester rubber, and (2) a copolymer resin comprising (i) styrene and acrylonitrile or (ii) styrene and methyl methacrylate,
   (C) an antimony oxide,
   (D) at least one bromine-containing reaction product selected from the group consisting of (1) compound having a molecular weight of from 1,200 to 6,000 and a bromine content of from 5.0 to 60% by weight which is obtained by reacting a bromine-containing epoxy compound and 1,3,5-tribromophenol, and (2) a compound obtained by reacting a bromine-containing epoxy compound having an epoxy equivalent of from 450 to 7,000 and a bromine content of from 5.0 to 52% by weight and an acrylonitrile-butadiene copolymer having a carboxyl group at the both terminals thereof and a molecular weight of from 1,000 to 10,000, and
   (E) at least one silicon-containing compound selected from the group consisting of (1) silicone oil, (2) a ladder silicone resin, and (3) an alkoxysilane having a mercapto group, a vinyl group or a methacryloyl group,
   wherein the amounts of the styrene compound and $\alpha,\beta$-unsaturated dicarboxylic acid imide compound in said heat-resistant resin (A) are from 10 to 50% by weight based on the total amount of said heat-resistant resin (A) and thermoplastic resin (B), respectively; the ratio of the $\alpha,\beta$-unsaturated dicarboxylic acid imide compound to the total amount of said styrene compound and $\alpha,\beta$-unsaturated dicarboxylic acid imide compound is from 5 to 50% by weight; the total amount of a rubber reinforcement used in the rubber-reinforced copolymer of said heat-resistant resin (A) and the butadiene rubber, ethylene-propylene rubber and acrylic ester rubber used in said high-impact resin is from 5 to 35% by weight based on the total amount of said heat-resistant resin (A) and thermoplastic resin (B); the amount of said antimony oxide is from 0.5 to 10 parts by weight per 100 parts by weight of the total amount of said heat-resistant resin (A) and thermoplastic resin (B); the amount of said bromine-containing reaction product (D) is from 5.0 to 40 parts by weight per 100 parts by weight of the total amount of said heat-resistant resin (A) and thermoplastic resin (B); and the amount of said silicon-containing compound (E) is from 0.01 to 15 parts by weight per 100 parts by weight of the total amount of said heat-resistant resin (A) and thermoplastic resin (B).

2. A resin composition as claimed in claim 1, wherein the copolymerization ratio of the $\alpha,\beta$-unsaturated dicarboxylic acid imide compound to the total amount of the styrene compound and the $\alpha,\beta$-unsaturated dicarboxylic acid imide compound in said heat-resistant resin ranges from 5 to 30% by weight.

3. A resin composition as claimed in claim 1, wherein said bromine-containing reaction product consists mainly of a compound represented by formula (III)

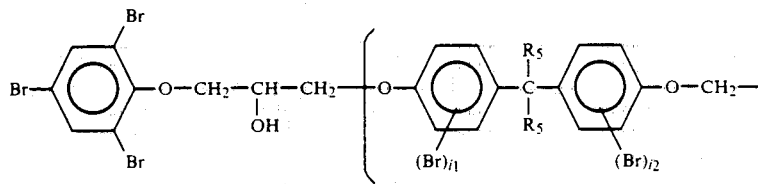

(III)

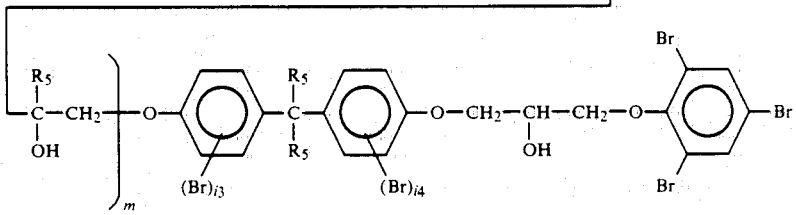

wherein $R_5$ represents a hydrogen atom or a methyl group; m represents 0 or an integer of from 1 to 7; and $i_1$ to $i_4$ each represents 0 or an integer of from 1 to 4, provided that $i_1$ to $i_4$ are not 0 at the same time, which is obtained by reacting a bromine-containing epoxy compound represented by formula (II):

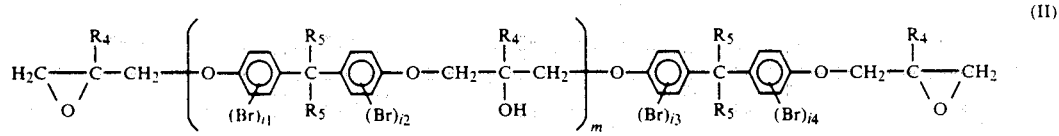

wherein $R_5$, m, and $i_1$ to $i_4$ are as defined above; and $R_4$, which may be the same as or different from $R_5$, represents a hydrogen atom or a methyl group, with 1,3,5-tribromophenol.

4. A resin composition as claimed in claim 3, wherein $i_1$ to $i_4$ in formula (III) each represents an integer of from 1 to 4.

5. A resin composition as claimed in claim 1, wherein said bromine-containing epoxy compound having an epoxy equivalent of from 450 to 7,000 and a bromine content of from 5.0 to 52% by weight is represented by formula (IV):

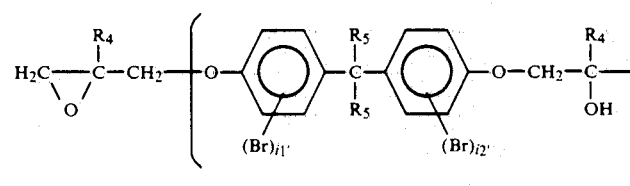

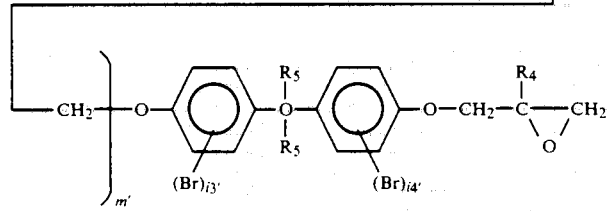

wherein $R_4$ and $R_5$, which may be the same or different, each represents a hydrogen atom or a methyl group; m' represents 0 or an integer of from 1 to 30; and $i_1'$ to $i_4'$ each represents an integer of from 1 to 4.

6. A resin composition as claimed in claim 1, wherein said acrylonitrile-butadiene copolymer having a carboxyl group at both terminals thereof has an acrylonitrile content of 40% by weight or less.

7. A resin composition as claimed in claim 1, wherein said acrylonitrile-butadiene copolymer having a carboxyl group at both terminals thereof is reacted in an amount of from 5.0 to 100 parts by weight per 100 parts by weight of the bromine-containing epoxy compound.

8. A resin composition as claimed in claim 1, wherein said silicone oil has a viscosity of from 10 to 100,000 cps as measured at 25° C.

9. A resin composition as claimed in claim 1, wherein said ladder silicone resin is represented by formula (V):

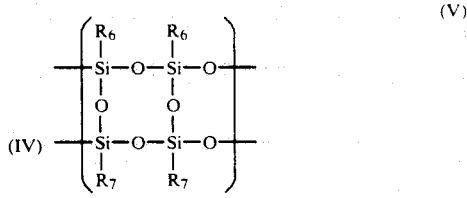

wherein R$_6$ and R$_7$, which may be the same or different, each represents a straight chain alkyl group having from 1 to 4 carbon atoms, a phenyl group, a hydroxyl group, a carboxyl group, or an aminoalkyl group having from 1 to 4 carbon atoms, the total number of the hydroxyl, carboxyl and aminoalkyl groups being not more than 10 mol% based on the number of the groups for R$_6$ and R$_7$; and n represents an integer of from 10 to 100.

10. A resin composition as claimed in claim 1, wherein said ladder silicone resin is heated at a temperature of from 80° to 300° C. for a period of from 5 to 1 hour.

11. A resin composition as claimed in claim 1, wherein said alkoxysilane is represented by formula (VI):

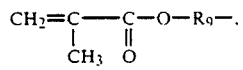

wherein R and R', which may be the same or different, each represents a straight-chain or branched alkyl group having from 1 to 6 carbon atoms; Y represents a vinyl group (CH$_2$=CH—), a mercaptoalkyl group represented by formula HS—R$_8$—, wherein R$_8$ represents a straight chain or branched alkylene group having from 1 to 6 carbon atoms, or a methacryloylalkyl group represented by formula

wherein R$_9$ represents a straight-chain branched alkylene group having from 1 to 6 carbon atoms; and x represents 2 or 3.

12. A resin composition as claimed in claim 1, wherein said bromine-containing reaction product is present in an amount of from 1 to 5 parts by weight per part by weight of the antimony oxide.

13. A resin composition as claimed in claim 1, wherein said silicone oil is present in an amount of from 0.1 to 3.0 parts by weight per 100 parts by weight of the total amount of said heat-resistant resin and thermoplastic resin.

14. A resin composition as claimed in claim 1, wherein said ladder silicone resin is present in an amount of from 0.01 to 15 parts by weight per 100 parts by weight of the total amount of said heat-resistant resin and thermoplastic resin.

15. A resin composition as claimed in claim 1, wherein said alkoxysilane is present in an amount of from 0.1 to 5.0 parts by weight per 100 parts by weight of the total amount of said heat-resistant resin and thermoplastic resin.

16. A resin composition as claimed in claim 1, wherein said silicone oil is present in an amount from 0.1 to 0.4 by weight per 100 parts by weight of the total of the heat-resistant resin (A) and the thermoplastic resin (B).

17. A resin composition as claimed in claim 1, wherein said silicone oil is polydimethylsiloxane.

18. A resin composition as claimed in claim 17, wherein said polydimethylsiloxane has a viscosity of 10 to 100,000 cp at 25° C.

* * * * *